United States Patent
Seff

(10) Patent No.: US 7,132,601 B1
(45) Date of Patent: Nov. 7, 2006

(54) ELECTRICAL ENCLOSURE ASSEMBLY AND MOISTURE-RESISTANT MOUNT THEREFOR

(75) Inventor: Paul D. Seff, Lincoln, IL (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/353,926

(22) Filed: Feb. 14, 2006

(51) Int. Cl.
*H02G 3/08* (2006.01)

(52) U.S. Cl. .......................... 174/50; 174/53; 174/58; 174/481; 220/3.2; 248/906

(58) Field of Classification Search ................. 174/48, 174/49, 50, 53, 57, 58, 480, 481, 503, 500, 174/54, 61; 220/3.2, 3.3, 3.4, 3.5, 3.6, 3.7, 220/3.8, 3.9, 4.02; 248/906, 343; 439/535, 439/536, 537, 538, 539; D13/152
See application file for complete search history.

(56) References Cited

U.S. PATENT DOCUMENTS

| | | | | |
|---|---|---|---|---|
| 2,656,948 A * | 10/1953 | McGee | | 220/3.8 |
| 3,288,910 A * | 11/1966 | Zerwes | | 174/53 |
| 4,265,365 A * | 5/1981 | Boteler | | 220/3.3 |
| 4,296,870 A * | 10/1981 | Balkwill et al. | | 220/3.3 |
| 4,408,695 A * | 10/1983 | Balkwill et al. | | 220/3.3 |
| 5,773,760 A * | 6/1998 | Stark et al. | | 220/3.8 |
| 6,239,365 B1 * | 5/2001 | McEvers | | 174/50 |
| 6,649,835 B1 * | 11/2003 | Gilleran | | 174/58 |
| 6,737,576 B1 * | 5/2004 | Dinh | | 174/50 |
| 6,951,983 B1 * | 10/2005 | Gretz | | 174/58 |
| 6,953,890 B1 | 10/2005 | Koessler | | |
| 7,005,578 B1 * | 2/2006 | Gretz | | 174/58 |

* cited by examiner

*Primary Examiner*—Angel R. Estrada
(74) *Attorney, Agent, or Firm*—Martin J. Moran

(57) ABSTRACT

A moisture-resistant mount is provided for mounting enclosures, such as air conditioner disconnect enclosures, to a support structure, such as a building wall or other structure. The enclosure includes a back panel having a plurality of holes. The mount, which preferably includes a single molded piece, includes a mounting portion receiving the back panel of the enclosure and forming an interface therebetween, a plurality of weatherproofing mechanisms including a shield, a flange, receptacles and protrusions to resist moisture from entering the enclosure, and an engagement portion coupling the mount to the support structure. The shield extends from the mounting portion to shield the interface, and the receptacles and protrusions engage the holes in the back panel. The support structure includes a number of layers. An integral flange on the mount engages one of the layers, and a second, finishing layer overlies the integral flange of the mount, but not the enclosure.

3 Claims, 3 Drawing Sheets

ELECTRICAL ENCLOSURE ASSEMBLY AND MOISTURE-RESISTANT MOUNT THEREFOR

BACKGROUND OF THE INVENTION

1. Field of the Invention

The present invention relates generally to electrical apparatus and, more particularly, to electrical apparatus enclosure assemblies, such as, for example, air conditioner disconnect enclosure assemblies. The invention also relates to mounts for electrical enclosure assemblies.

2. Background Information

Electrical apparatus including, for example, air conditioners for residential and commercial buildings, often include a disconnect device. The disconnect device generally includes an electrical enclosure for housing electrical equipment including, for example, a connector and/or switch for disconnecting the air conditioner from a power source. Among other purposes, the enclosure serves to protect the electrical equipment from the environment and, in particular, from moisture which can cause a hazardous condition, such as a short circuit, or which could otherwise damage the electrical equipment.

The electrical enclosure typically comprises a folded metal box including a back panel, and a pair of sides, a top and bottom. The sides, the top and the bottom each extend outwardly from the back panel to form the enclosure. The enclosure typically further includes a front cover, such as a door or access panel. In some applications, where the electrical enclosure is mounted, for example, directly to the surface of an exterior wall of a building, the back panel is attached directly to the wall surface using a plurality of screws or other suitable fasteners. In other applications where a finishing material or layer, such as, for example and without limitation, stucco, will be subsequently added over the surface of the underlying wall, a mount is required to provide the appropriate spacing between the back panel of the enclosure and the underlying wall surface. In other words, the mount serves to accommodate the thickness of the finishing layer.

Known mounts generally comprise metal brackets that mount on one side to the underlying wall structure and that receive the air conditioner disconnect enclosure on the opposite side. The bracket is then at least partially covered with stucco or other suitable finishing material. However, such mounting brackets generally include a number of seams and holes which undesirably provide points of entry for moisture to enter the enclosure. Such points of entry are particularly prevalent between the back panel of the enclosure and the mounting bracket. Specifically, moisture can enter the seam or interface between these two components, and can then enter the disconnect enclosure through, for example, screw holes or other apertures. Moreover, the metal material comprising the bracket can rust when exposed to moisture.

There is, therefore, room for improvement in electrical enclosure assemblies such as, for example, air conditioner disconnect enclosure assemblies, and in mounts therefor.

SUMMARY OF THE INVENTION

These needs and others are met by the present invention, which is directed to a moisture-resistant mount for mounting enclosures, such as air conditioner disconnect enclosures, to a support structure, such as the wall of a building or other structure. The moisture-resistant mount includes a plurality of weatherproofing mechanisms structured to resist moisture from entering the enclosure.

As one aspect of the invention, a mount is provided for mounting an enclosure to a support structure. The enclosure includes a back panel having a plurality of holes. The support structure includes a structural member and a number of layers coupled to the structural member. The mount comprises: a mounting portion structured to receive the back panel of the enclosure; a plurality of weatherproofing mechanisms disposed on the mounting portion, the weatherproofing mechanisms being structured to resist moisture from entering the enclosure; and an engagement portion structured to couple the mount to the support structure. The mount may comprise a single molded piece.

The weatherproofing mechanisms may be selected from the group consisting of a shield, a flange, receptacles and protrusions. The holes of the back panel of the enclosure may include beveled apertures and non-beveled apertures wherein the receptacles are structured to receive the beveled apertures of the back panel, and the protrusions are structured to be inserted into the non-beveled apertures of the back panel. The back panel of the enclosure may include as the non-beveled apertures, a pair of non-beveled apertures, and the protrusions may comprise a pair of integral sleeves extending outwardly from the mounting portion of the mount, wherein the pair of integral sleeves are inserted into the pair of non-beveled apertures.

The mounting portion may comprise a generally flat surface wherein when the enclosure is coupled to the mount, the generally flat surface forms an interface with the back panel of the enclosure. The shield may comprise a hood extending outwardly from the generally flat surface of the mounting portion and structured to overly a portion of the interface in order to resist moisture from entering the interface. The shield may further comprise a pair of integral sides extending from the hood in order to further shield the interface from moisture.

The mounting portion may further comprise a top, a bottom, and first and second sides extending outwardly from the generally flat surface. The flange may comprise an integral flange extending generally perpendicularly from the top, the bottom, and the first and second sides, and structured to engage one of the layers of the support structure. The layers of the support structure may include a first layer coupled to the support member, and a second layer disposed over the first layer wherein the integral flange is structured to be coupled to the first layer, and wherein the second layer is structured to be disposed over the first layer and the integral flange coupled thereto. The engagement portion may comprise a number of extensions extending outwardly from the mounting portion in order to engage the structural member of the support structure.

As another aspect of the invention, an electrical enclosure assembly comprises: an electrical enclosure including a back panel having a plurality of holes; a structural member; a number of layers coupled to the structural member; a plurality of fasteners; and a mount comprising: a mounting portion receiving the back panel of the electrical enclosure, a plurality of weatherproofing mechanisms structured to resist moisture from entering the electrical enclosure, at least one of the weatherproofing mechanisms being disposed on the mounting portion, and an engagement portion coupling the mount to the structural member.

The structural member may comprise a structural beam including a first side and a second side opposite the first side. The mounting portion may include a top, a bottom, and first and second sides, and the engagement portion may comprise a first tab and a second tab, wherein the first tab may extend from the mounting portion proximate the first side of the mounting portion and the top of the mounting portion in order to engage the first side of the structural beam, and the second tab may extend from the mounting portion proximate the second side of the mounting portion and the bottom of the mounting portion in order to engage the second side of the structural beam. The first and second tabs may further include elongated apertures wherein the fasteners are inserted through the elongated apertures in order to fasten the mount to the structural beam. When the fasteners are loosened, the elongated apertures may provide adjustment of the mount with respect to the support beam.

The electrical enclosure may be an air conditioner disconnect enclosure, and the layers may comprise underlying and finishing layers. The mount and the air conditioner disconnect enclosure coupled thereto may be coupled to the underlying layer, and the finishing layer may be disposed on top of the underlying layer, and over a portion of the mount, but not the air conditioner disconnect enclosure coupled thereto.

As another aspect of the invention, an electrical enclosure assembly comprises: an electrical enclosure including a back panel having a plurality of holes; a structural member; a number of layers coupled to the structural member; a plurality of conduits; and a mount comprising: a mounting portion receiving the back panel of the electrical enclosure, a plurality of weatherproofing mechanisms on the mounting portion, the weatherproofing mechanisms being structured to resist moisture from entering the enclosure, and an engagement portion coupling the mount to the structural member, wherein the conduits are inserted into the holes of the back panel of the electrical enclosure. The conduits may be structured to receive a number of electrical conductors to the electrical enclosure.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
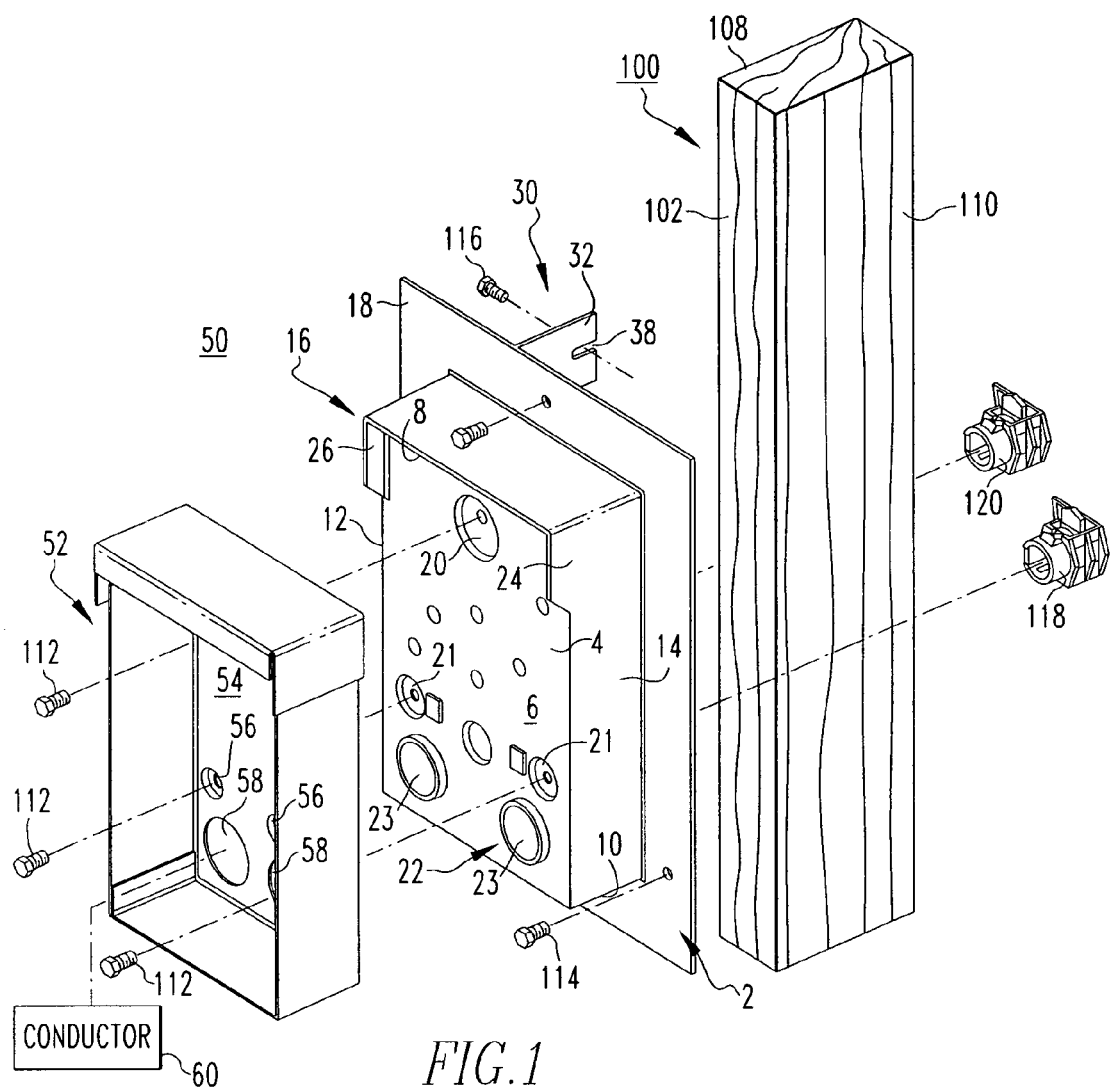
FIG. 1 is an exploded isometric view of an air conditioning disconnect enclosure and a mount for mounting the air conditioning disconnect enclosure to a wall stud in accordance with an embodiment of the present invention.

For purposes of illustration, the invention will be described as applied to air conditioning disconnects mounted to the exterior of a building wall, although it will become apparent that the invention could be applied to mount a variety of different housings to any suitable structure for use in a wide range of applications.

Directional phrases used herein, such as, for example, left, right, top, bottom, front, back, and derivatives thereof, relate to the orientation of the elements shown in the drawings and are not limiting upon the claims unless expressly recited therein.

As employed herein, the term "fastener" refers to any suitable connecting or tightening mechanism expressly including, but not limited to, rivets, screws, nails, brads, staples, bolts, and the combinations of bolts and nuts (e.g., without limitation, lock nuts) and bolts, washers and nuts and any known or suitable adhesive, such as, glue or tape.

As employed herein, the term "layer" refers to any known or suitable material which is coupled to a structural member and is disposed between a mount and such structural member. For example, and without limitation, in applications where the support structure comprises a building wall, and the structural member comprises a beam member of the wall, the layers may include, for example and without limitation, sheetrock, plaster, drywall, brick, stone, insulating foam sheet, and other suitable layers. As employed herein, the foregoing layers are typically, although not necessarily, "underlying layers" which are covered by another layer which is referred to herein as a "finishing layer". The finishing layer may comprise any known or suitable material (e.g. without limitation, stucco; wood paneling; textured paint) which is applied over the underlying layer in order to provide a resultant finished appearance to the support structure.

As employed herein, the phrase "weatherproofing mechanism" refers to any known or suitable mechanism for resisting the undesired entry of moisture and expressly includes, but is not limited to, shields, flanges, receptacles, protrusions, and conduits. Through use of such weatherproofing mechanisms, the present invention provides a substantially moisture-resistant mount which substantially prevents the undesired entry of moisture into the electrical enclosure coupled thereto.

As employed herein, the statement that two or more parts are "coupled" together shall mean that the parts are joined together either directly or joined through one or more intermediate parts.

As employed herein, the term "number" shall mean one or more than one (i.e., a plurality).

FIG. 1 shows a mount 2 for an electrical enclosure assembly 50 in accordance with the invention. The electrical enclosure in the example shown and described herein is an air conditioner disconnecting enclosure 52 which includes a back panel 54 having a plurality of holes 56, 58. Specifically, the back panel 54 of the enclosure 52 includes beveled apertures 56 which are generally disposed at locations through which a fastener, such as screws 112 are received, and non-beveled apertures 58. A pair of non-beveled apertures 58 is shown in the example of FIG. 1 (one of the non-beveled apertures 58 is only partially shown). The non-beveled apertures 58 provide access through the back panel 54 of the enclosure 52 for electrical components, such as, for example and without limitation, conductor 60.

The mount 2 generally includes a mounting portion 4 structured to receive the back panel 54 of the enclosure 52, a plurality of weatherproofing mechanisms disposed on the mounting portion 4 and structured to resist moisture from entering the enclosure 52, and an engagement portion 30 structured to couple the mount 2 to a support structure 100. In the example shown and described herein, the support structure is a wall 100 of a building (best shown in FIG. 4), and includes a structural member such as the beam member 102, shown. It will, however, be appreciated that the mount 2 of the invention could alternatively be mounted to any known or suitable support structure (not shown) other than the wall 100 and structural member 102 thereof. It will also be appreciated that any known or suitable weatherproofing mechanisms could be employed in any suitable configuration other than the example shield 16, flange 18, receptacles 20, 21 and protrusions 22, 23 shown and described herein.

Figure 2:
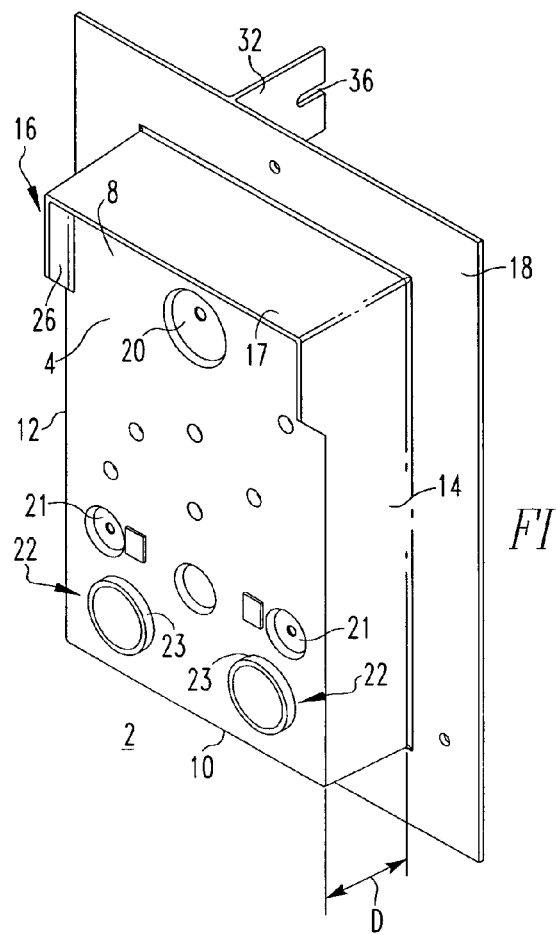
FIG. 2 is an isometric view of the front side of the mount of FIG. 1.

Also referring to FIG. 2, it will be appreciated that the receptacles 20, 21 generally comprise indentations or recesses in the mounting portion 4 of the mount 2. Such receptacles 20, 21 are structured to receive the aforementioned beveled apertures 56 and thereby inhibit the ability for moisture to enter the enclosure 52 through the beveled apertures 56. To provide further moisture resistance, the protrusions 22, which in the example shown and described herein comprise integral sleeves 23 that extend outwardly from mounting portion 4, are structured to be inserted into the non-beveled apertures 58 on the back panel 54 (best shown in the assembled view of FIG. 4).

Figure 3:
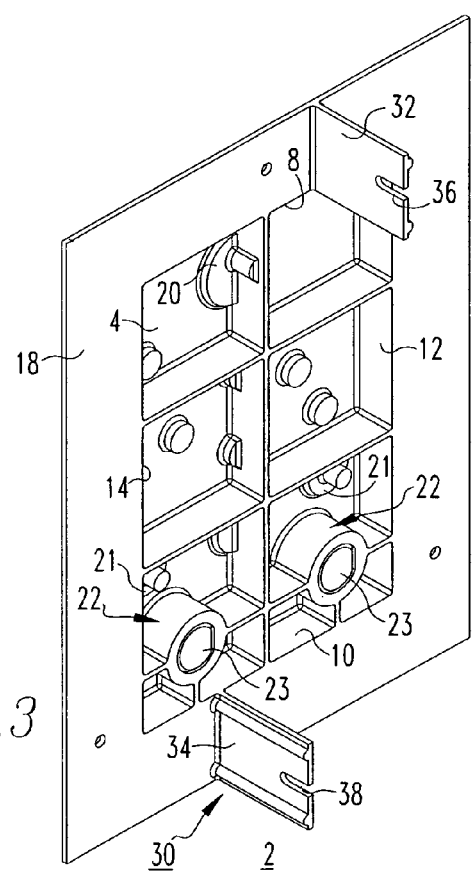
FIG. 3 is an isometric view of the back side of the mount of FIG. 1.
Figure 4:
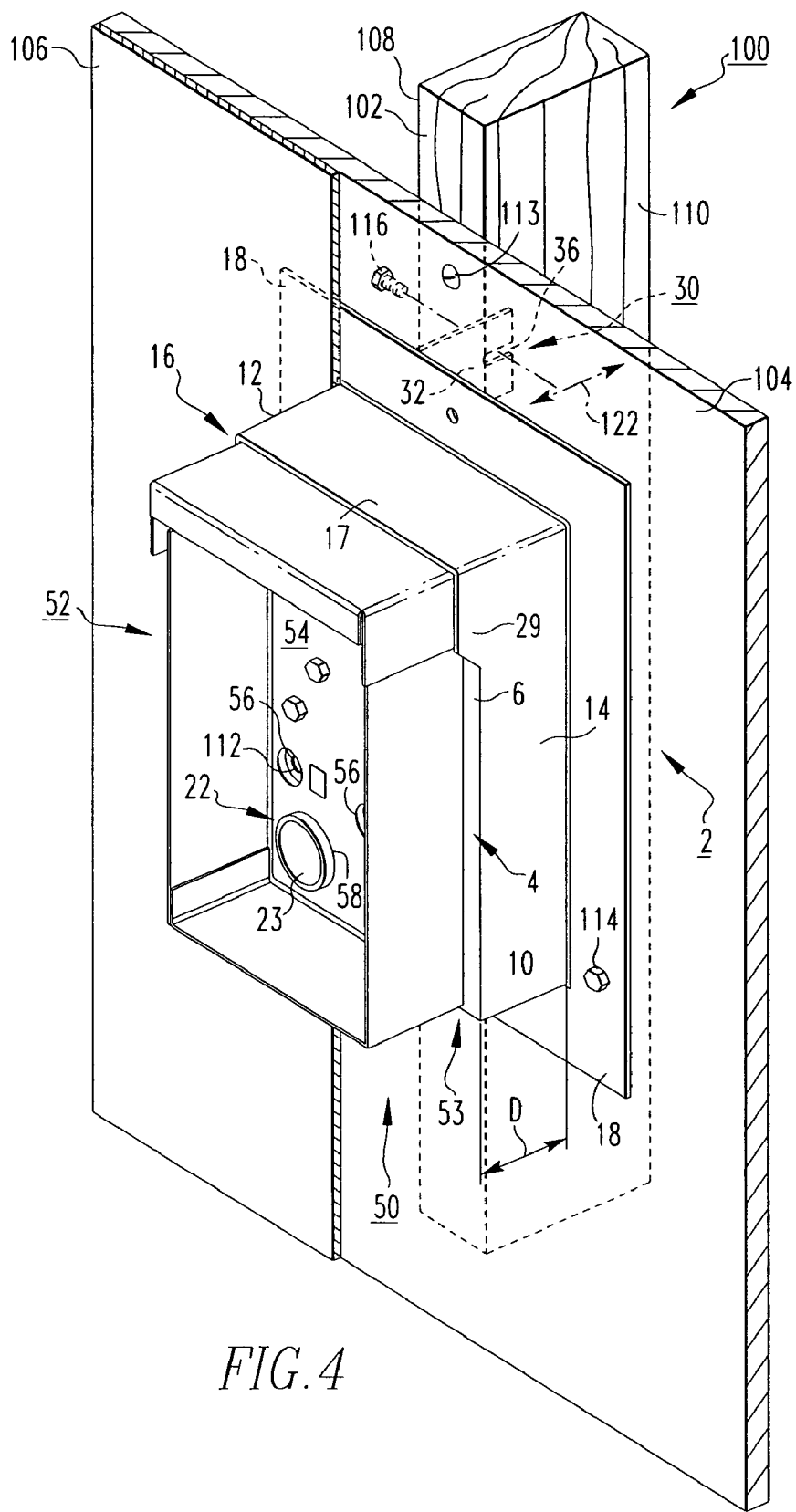
FIG. 4 is an assembled isometric view of the air conditioning disconnect enclosure with the front panel removed, and the mount of FIG. 1.

Additionally, the mounting portion 4 includes a generally flat surface 6, a top 8, a bottom 10, and first and second sides 12, 14 extending outwardly from the generally flat surface 6. When the enclosure 52 is coupled to the mount 2, as shown in FIG. 4, the generally flat surface 6 of mount 2 forms an interface 53 with the back panel 54 of enclosure 52. The shield 16, which comprises a hood 17, extends outwardly from the top 8 (FIGS. 1, 2 and 3) of the generally flat surface 6 of mounting portion 4 and overlies a portion of the interface 53, as shown in FIG. 4, in order to resist moisture from entering the interface 53. In this manner, the enclosure assembly 50 (FIGS. 1 and 4) is made substantially weatherproof. A still further weatherproofing mechanism is provided by equipping the shield 16 with a pair of integral sides 24, 26 that extend generally downward from hood 17 in order to further shield the interface 53 from moisture.

As shown in FIG. 1, a pair of conduits 118, 120 can optionally be employed to provide a moisture-resistant pathway for receiving a number of electrical conductors, such as 60, to the enclosure 52. Specifically, the conduits 118, 120 are received in the back side of the integral sleeves 23 (best shown in FIG. 3) of mount 2, and are ultimately inserted into non-beveled apertures 58 of the back panel 54 of enclosure 52. Accordingly, the conduits 118, 120 preferably engage with the integral sleeves 23 of mounting portion 4 of mount 2 in order to provide a moisture-resistant passageway from the support structure 100 through mount 2, through non-beveled apertures 58 and into enclosure 52. It will be appreciated that the conductors, such as 60 (shown in simplified form in FIG. 1), could comprise any known or suitable electrical conductor such as, for example and without limitation, electrical wires or cables.

The mount 2 further includes a flange weatherproofing mechanism which comprises an integral flange 18 that extends generally perpendicularly from the top 8, the bottom 10, and the first and second sides 12, 14 of mounting portion 4. FIGS. 2 and 3 respectively show the front and back sides of the mount 2 and integral flange 18 therefor.

As shown in FIG. 4, the integral flange 18 is structured to engage one of the layers 104, 106 of support structure 100. More specifically, in the example shown, the integral flange 18 is coupled to an underlying layer 104 which may comprise, for example and without limitation, a foam insulation sheet 104 that is coupled to the structural beam 102. The foam insulation sheet 104 may be coupled to the beam 102 using any known or suitable fastener, such as the screws 113. Similarly, the integral flange 18 may be coupled to the underlying layer 104 using any known or suitable fastener, such as screw 114. It will, however, be appreciated that any known or suitable underlying layer other than the foam sheet 104 could be employed or alternatively, that no underlying layer needs to be employed, in which case the mount 2 would be directly coupled to the structural beam 102. It will further be appreciated that any known or suitable fasteners other than the screws 113, 114 shown, could be employed to achieve (e.g., without limitation, glue or tape) the desired connections. For example, a nail, brad, staples, or any known or suitable adhesive (e.g., without limitation, glue or tape) could be employed to couple the mount 2 to structural member 102.

As shown in FIGS. 3 and 4, the exemplary engagement portion 30 which couples mount 2 to the structural beam 102 (FIG. 4) comprises a number of extensions, such as first and second tabs 32, 34. More specifically, the first tab 32 extends from mounting portion 4 proximate the first side 12 of the mounting portion 4 and top 8 of the mounting portion 4, in order to engage the first side 108 (FIG. 4) of the structural beam 1102 (FIG. 4). As shown in FIG. 3, the second tab 34 extends from mounting portion 4 proximate the second side 14 of the mounting portion 4 and the bottom 10 of the mounting portion 4 such that it will engage the second side 110 (FIG. 4) of the structural beam 102 (FIG. 4). The first and second tabs 32, 34 further include respective elongated apertures 36, 38 structured to receive fasteners, such as the screw 116 shown in FIG. 4. Specifically, the fastener 116 is inserted through the elongated aperture 36 in order to fasten the mount 2 to structural beam 102. When the fastener 116 is loosened, as shown in FIG. 4, the elongated aperture 36 provides adjustment of the mount 2 with respect to the structural beam 102. Such adjustment is represented by arrow 122 in FIG. 4, which designates the ability to adjust mount 2 inward and outward with respect to the structural beam 102. In this manner, the mount 2 may be adjusted, as necessary, to accommodate the underlying layer 104 or layers. It will, however, be appreciated that any known or suitable alternative fastening mechanism could be employed, and that any known or suitable adjustment mechanism other than the exemplary elongated aperture 36, could be employed to provide the desired adjustment of the mount 2.

FIG. 4 shows the electrical enclosure assembly 50 as employed on an exterior wall 100 of a building. Specifically, the wall 100 includes the structural beam 102 to which the single underlying layer 104 is coupled. In application, the mount 2 is adjusted with respect to the structural beam 102, and fastener 116 is fastened through elongated aperture 36 in tab 32, in order to secure the mount 2 to the wall 100 in the desired position. The integral flange 18 can then be coupled to underlying layer 104. Finally, the finishing layer which, in the example of FIG. 4, comprises stucco 106, is applied on top of the underlying layer 104 and a portion of mount 2, but not the air conditioner disconnect enclosure 52, which is coupled to the mount 2. Specifically, the stucco 106 is applied over the flange 18 (partially shown in hidden line drawing in FIG. 4) and perhaps a portion of the top 8, the bottom 10, and the sides 12, 14 of the mounting portion 4 of mount 2, but the stucco 106 does not engage the enclosure 52. In this manner, the air conditioner disconnect enclosure 52 is adequately spaced from the finishing layer (e.g., without limitation, stucco 106) so as to avoid contact between the finishing layer and the metal of the enclosure 52. Instead, contact by finishing layer 106 is limited to the mount 2, which preferably comprises a single molded piece that is highly moisture-resistant, as described hereinabove. It will, therefore, be appreciated that the mounting portion 4 of mount 2 can be made to have any suitable depth, indicated by the letter D in FIG. 4, in order to obtain the desired spacing between back panel 54 of enclosure 52 and finishing layer 106. Among other benefits, such spacing substantially eliminates the occurrence of undesirable discoloration of the finishing layer 106 which can be caused, for example, by the metallic enclosure 52 as it ages and begins to rust or otherwise degrade. Thus, the mount 2 in accordance with the invention provides an effective weatherproof base for receiving a wide variety of different electrical enclosures (e.g., without limitation, air conditioner disconnect enclosure 52) while resisting undesirable entry of moisture into the enclosure, and substantially eliminating other associated problems (e.g., without limitation, damage to electrical components based within the enclosure 52; discoloration of finishing layer 106).

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A mount for mounting an enclosure to a support structure, said enclosure including a back panel having a plurality of holes, said support structure including a structural member and a number of layers coupled to said structural member, said mount comprising:
   a mounting portion structured to receive the back panel of said enclosure;
   a plurality of weatherproofing mechanisms disposed on said mounting portion, said weatherproofing mechanisms being structured to resist moisture from entering said enclosure;
   an engagement portion structured to couple said mount to said support structure;
   wherein said weatherproofing mechanisms are selected from the group consisting of a shield, a flange, receptacles and protrusions; and
   wherein the holes of the back panel of said enclosure include beveled apertures and non-beveled apertures; wherein said receptacles are structured to receive the beveled apertures of said back panel; and wherein said protrusions are structured to be inserted into the non-beveled apertures of the back panel.

2. The mount of claim 1 wherein the back panel of said enclosure includes as said non-beveled apertures, a pair of non-beveled apertures; and wherein said protrusions comprise a pair of integral sleeves extending outwardly from said mounting portion of said mount, said pair of integral sleeves being inserted into said pair of non-beveled apertures.

3. An electrical enclosure assembly comprising:
   an electrical enclosure including a back panel having a plurality of holes;
   a structural member;
   a number of layers coupled to said structural member;
   a plurality of fasteners; and
   a mount comprising:
   a mounting portion receiving the back panel of said electrical enclosure,
   a plurality of weatherproofing mechanisms structured to resist moisture from entering said electrical enclosure, at least one of said weatherproofing mechanisms being disposed on said mounting portion,
   an engagement portion coupling said mount to said structural member; and
   wherein said weatherproofing mechanisms are selected from the group consisting of a shield, a flange, receptacles and protrusions; and
   wherein the holes of the back panel of said enclosure include beveled apertures and non-beveled apertures; wherein said receptacles receive the beveled apertures of said back panel; and wherein said protrusions extend outwardly from said mounting portion of said mount and are inserted into the non-beveled apertures of the back panel of said enclosure.

* * * * *